Patented Oct. 22, 1940

2,219,042

UNITED STATES PATENT OFFICE 2,219,042

PREPARATION OF CATALYSTS

Heinrich Heckel, Dinslaken, and Otto Roelen, Oberhausen-Holten, Germany, assignors, by mesne assignments, to Hydrocarbon Synthesis Corporation, Linden, N. J.

No Drawing. Application September 17, 1938, Serial No. 230,511. In Germany September 27, 1937

3 Claims. (Cl. 23—236)

Our invention relates to the preparation of catalysts containing cobalt and magnesium oxide and more particularly of such catalysts which contain cobalt and magnesium oxide in a predetermined ratio. These catalysts may also contain additions of activators such as thorium oxide.

It is an object of our invention to provide improved catalysts which are particularly suitable for use in the synthetic production of benzine hydrocarbons from hydrogen and the oxides of carbon.

Other objects will appear as the specification proceeds.

In the synthetic production of benzine hydrocarbons by catalytic hydrogenation of oxides of carbon, catalysts which contain, in addition to cobalt, also magnesium and, if desired, also thorium or other activators, have proven to be particularly efficient. These catalysts contain, as a rule, about 3 to 20 parts magnesium oxide per 100 parts cobalt. They are distinguished by a long life and can be re-used many times without their catalytic efficiency dropping and without raising of the temperature or a regeneration of the catalysts being required.

In the preparation of such catalysts cobalt and magnesium compounds are precipitated from a solution of their salts. As a rule the precipitate is mixed with carrier substances, such as kieselguhr, and the precipitated cobalt compounds reduced to cobalt by hydrogenation. If in the preparation of such cobalt-magnesium-catalysts for instance a solution, which contains these two metals as nitrates or chlorides and in the proportion in which they shall be incorporated in the catalyst, is precipitated with an alkali metal carbonate, a relatively extended time is required for the precipitation of the whole of the magnesium. Since in this case the precipitated cobalt is in contact with the precipitating liquor for a longer period of time, the precipitate ages so that the surface structure of this main part of the catalyst to be prepared is unfavorably influenced. If the time of precipitation is however shortened in order to avoid this drawback, the precipitated catalyst does not contain that quantity of magnesium which is required for imparting to the cobalt its full efficacy.

We have now found that useful cobalt-magnesium-catalysts of high quality are obtained from solutions of the nitrates or chlorides of cobalt and magnesium, if a magnesium solution is employed which contains more magnesium than corresponds to the intended stoichiometric relation of magnesium to cobalt in the catalyst to be prepared.

In this manner we succeed for instance in precipitating a catalyst from a solution, which contains chlorides and/or nitrates of cobalt as well as of magnesium, in so short a time that the precipitated cobalt, carbonate, is not objectionably affected.

According to another modification of our invention we first precipitate magnesium alone from a solution which contains more magnesium than corresponds to the desired stoichiometric ratio of magnesium to cobalt in the catalyst to be prepared, and we so select the quantity of magnesium that a period of about 1–3 minutes suffices for precipitating the magnesium from the boiling solution. Thereafter the quantity of cobalt required for the catalyst is precipitated in the same solution so as to settle on the previously precipitated magnesium. The precipitate is filtered directly after it has separated out and after the carrier material has been added.

The efficacy of the catalyst to be prepared can precisely be controlled by adjusting the excess of magnesium employed. The excess of magnesium in the precipitating liquor may for instance amount to 25–75%. In many cases however an excess of 10% will already suffice. The excess may be the less, the higher the precipitating temperature, the longer the time of precipitation and the higher the alkalinity of the precipitating liquor.

Excellent cobalt-magnesium-catalysts are thus obtained by precipitating together or in succession magnesium and cobalt in the manner described; in the second modification of our process care must however be taken that the cobalt precipitate remains in contact with the solution for as short a time as possible. Catalysts which contain 10–12 parts magnesium oxide per 100 parts cobalt and which were precipitated from a cobalt-magnesium-solution containing about 40 grams cobalt and 6 grams magnesium oxide per liter, i. e. 15 parts MgO per 100 parts Co, proved to be particularly useful.

The following examples illustrate the invention more in detail without however limiting it in any way.

Example 1

A solution containing 24.91 grams Co in the form of the nitrate and 3.97 grams MgO likewise in the form of the nitrate, i. e. 16 parts MgO per 100 parts Co, is precipitated in boiling state with a solution containing about 10% sodium carbonate. About 1–2 minutes are required for the precipitation. The necessary quantity of carrier material is then added and the whole of the precipitate filtered off. A precipitate is obtained which in addition to the total quantity of Co contains 2.42 grams MgO, i. e. 9.75 parts MgO per 100 parts Co.

*Example 2*

2 liters of a magnesium nitrate solution, which contains 150 grams MgO, are entered in 30 liters of a boiling ten per cent solution of sodium carbonate in the course of about 1-2 minutes, during which time the greater part of the magnesium is precipitated under the form of the carbonate. There are then introduced into the solution, which is kept boiling, in the course of about 1-2 minutes 10 liters of a cobalt nitrate solution which contain 1 kg. cobalt. The necessary carrier material is thereupon added and the precipitate filtered from the hot solution. The precipitate contains 11.9 parts magnesium oxide per 100 parts cobalt. Thus about 80% of the quantity of MgO which was contained in the magnesium nitrate solution employed, have passed over into the precipitate.

Our method can also be employed for the preparation of such catalysts which contain thorium oxide as activator in addition to magnesium oxide. Such catalysts may contain 1 to 5 parts $ThO_2$ per 100 parts Co. For instance when precipitating a cobalt-thorium-magnesium solution containing Co, MgO and $ThO_2$ in the ratio of 100:10:5, we obtained, in consequence of the fact that the magnesium is incompletely precipitated, which may be due to the solubility of the magnesium bicarbonate, a catalyst composed of 100 parts Co, 8 parts MgO and 5 parts $ThO_2$, 20% of the magnesium oxide being not precipitated. In order to produce such a Co-MgO-$ThO_2$-catalyst, one may for instance start from a solution which contains 40-41 grams Co, 4.0-4.1 grams MgO and 2.0-2.05 grams $ThO_2$ per liter. Three samples precipitated from such a solution, before having been reduced, showed the following composition:

|  | Sample 1 | Sample 2 | Sample 3 |
|---|---|---|---|
|  | Percent | Percent | Percent |
| Co | 23.84 | 22.86 | 22.66 |
| $ThO_2$ | 1.15 | 1.16 | 1.12 |
| MgO | 1.89 | 1.87 | 1.82 |
| Kieselguhr | 46.74 | 45.85 | 45.12 |

Various changes may be made in the details disclosed in the forgoing specification without departing from the invention or sacrificing the advantages thereof.

We claim:

1. In the preparation of catalysts containing magnesium oxide and cobalt for the catalytic hydrogenation of carbon oxides, the steps of precipitating together basic compounds of magnesium and of cobalt from a solution of the group of magnesium and cobalt salts constituted by the chlorides and nitrates, which solution contains at least approximately 10% more magnesium in relation to cobalt than corresponds to the ratio of magnesium to cobalt in the catalyst to be prepared, and removing the precipitate before complete precipitation of the magnesia occurs.

2. In the preparation of catalysts containing magnesium oxide and cobalt for the catalytic hydrogenation of carbon oxides, the steps of first precipitating a basic magnesium compound from a solution of a magnesium salt of the group of salts constituted by magnesium chloride and magnesium nitrate, thereafter precipitating, in the same liquor and in the presence of the magnesium precipitate, a basic cobalt compound by the addition of a solution of a cobalt salt of the group constituted by cobalt chloride and cobalt nitrate, the magnesium solution containing at least approximately 10% more magnesium in relation to the cobalt added than the catalyst to be prepared, and removing the precipitate before complete precipitation of the magnesia occurs.

3. In the preparation of catalysts containing MgO, Co and $ThO_2$ for the catalytic hydrogenation of carbon oxides, the steps of precipitating basic compounds of magnesium, cobalt and thorium from a solution of the group of salts constituted by the chlorides and nitrates, which solution contains at least approximately 10% more magnesium in relation to cobalt than corresponds to the ratio of magnesium to cobalt in the catalyst to be prepared, and removing the precipitate before complete precipitation of the magnesia occurs.

HEINRICH HECKEL.
OTTO ROELEN.